United States Patent
Allen

(10) Patent No.: US 10,376,049 B2
(45) Date of Patent: Aug. 13, 2019

(54) ATHLETIC FACILITY FURNITURE

(71) Applicant: Sam Allen, Maypearl, TX (US)

(72) Inventor: Sam Allen, Maypearl, TX (US)

(*) Notice: Subject to any disclaimer, the term of this patent is extended or adjusted under 35 U.S.C. 154(b) by 11 days.

(21) Appl. No.: 15/878,578

(22) Filed: Jan. 24, 2018

(65) Prior Publication Data

US 2018/0146779 A1    May 31, 2018

(51) Int. Cl.
| | | |
|---|---|---|
| *A47B 61/00* | (2006.01) | |
| *A47B 95/00* | (2006.01) | |
| *A47B 61/04* | (2006.01) | |
| *F16B 12/50* | (2006.01) | |
| *A47B 47/02* | (2006.01) | |

(52) U.S. Cl.
CPC ............ *A47B 61/003* (2013.01); *A47B 61/04* (2013.01); *A47B 95/00* (2013.01); *F16B 12/50* (2013.01); *A47B 47/021* (2013.01); *A47B 61/006* (2013.01)

(58) Field of Classification Search
CPC ..... A47B 95/00; A47B 47/021; A47B 61/003; A47B 61/04; A47B 61/006; F16B 12/50
See application file for complete search history.

(56) References Cited

U.S. PATENT DOCUMENTS

| | | | | |
|---|---|---|---|---|
| 1,390,144 A * | 9/1921 | Launder | ............... | A47B 61/003 211/162 |
| 1,391,495 A * | 9/1921 | Parsons | ................ | A47B 61/003 211/162 |
| 2,722,468 A * | 11/1955 | Perrin | .................... | A47B 47/05 217/12 R |
| 2,736,627 A * | 2/1956 | Horn | .................... | A47B 61/006 211/113 |
| 2,948,405 A * | 8/1960 | Smith | ................. | A47B 61/003 108/102 |
| 2,975,949 A * | 3/1961 | Lutsky | ................. | A47B 61/003 211/94.01 |
| 3,168,365 A * | 2/1965 | Evans | .................... | A47B 57/16 108/109 |
| 3,389,807 A * | 6/1968 | Manning | ................. | H03H 7/01 211/85.3 |
| 4,226,488 A * | 10/1980 | Vincent | ................... | A47B 67/04 312/108 |
| 4,426,057 A * | 1/1984 | Nudo | .................... | A47B 61/003 108/29 |
| 4,502,741 A * | 3/1985 | DeVries | ............... | A47B 47/042 108/102 |
| 6,474,901 B1 * | 11/2002 | Thurston | ................. | F16B 12/50 403/381 |
| 7,641,414 B1 * | 1/2010 | Joyce | ................... | A47B 47/042 403/231 |
| 8,622,489 B2 * | 1/2014 | Crabtree, II | ......... | A47B 47/042 312/108 |
| 2004/0263030 A1 * | 12/2004 | Humberto | .............. | A47B 57/10 312/245 |

(Continued)

*Primary Examiner* — Hanh V Tran
(74) *Attorney, Agent, or Firm* — James E. Walton

(57) ABSTRACT

A locker includes a pair of spaced-apart upstanding sidewalls, at least one member extending between the sidewalls, the member having a pair of ends, a tongue formed on each end of the member, a groove formed in each sidewall, each groove dimensioned to receive the tongue formed in the end of the member; and a metallic reinforcing member secured to each of the member and the sidewall at an intersection thereof.

8 Claims, 7 Drawing Sheets

(56) References Cited

U.S. PATENT DOCUMENTS

| | | | | |
|---|---|---|---|---|
| 2007/0080120 A1* | 4/2007 | Greiner | ................ | A47B 61/003 |
| | | | | 211/34 |
| 2009/0000237 A1* | 1/2009 | Borgman | ............... | A47B 95/00 |
| | | | | 52/716.1 |
| 2010/0066222 A1* | 3/2010 | Ito | .......................... | A47B 61/04 |
| | | | | 312/326 |
| 2014/0034643 A1* | 2/2014 | Canfield | ................ | B65D 85/00 |
| | | | | 220/212 |
| 2014/0048504 A1* | 2/2014 | Hayashida | ........... | A47B 61/003 |
| | | | | 211/162 |
| 2016/0324312 A1* | 11/2016 | Mustafa | ................ | A47B 61/003 |
| 2017/0143116 A1* | 5/2017 | Ueda | ...................... | A47B 49/00 |
| 2017/0204557 A1* | 7/2017 | Bunch | .................... | D06F 79/02 |
| 2017/0295928 A1* | 10/2017 | Allen | .................... | A47B 88/42 |
| 2017/0340944 A1* | 11/2017 | Gellman | ................ | A47B 81/00 |
| 2018/0058760 A1* | 3/2018 | Allen | .................. | A47B 61/003 |

* cited by examiner

ATHLETIC FACILITY FURNITURE

BACKGROUND

1. Field of the Invention

The present application relates generally to improvements in lockers. storage cabinets, and other types of furniture used in athletic or sporting facilities, and more specifically, to the construction of and features incorporated into such lockers.

2. Description of Related Art

The aesthetics and utility of lockers or storage cabinets in "locker rooms" of athletic and sporting facilities of sports teams and country clubs, for example, have become a measure of the quality and prestige of such organizations and an increasingly important aspect of recruiting new team or club members. Modern lockers are a far cry from the simple wood or metal cabinets of the past.

Modern lockers incorporate storage for specific items of equipment, such as helmets and shoes, and features promoting comfort and luxury. There is a constant need for improvement in both functional and aesthetic aspects of such lockers.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
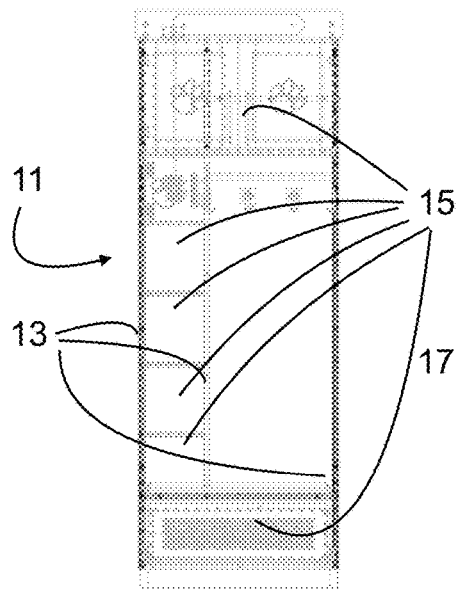
FIG. 1 is a front elevation view of an exemplary locker according to the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the locker seat assembly are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
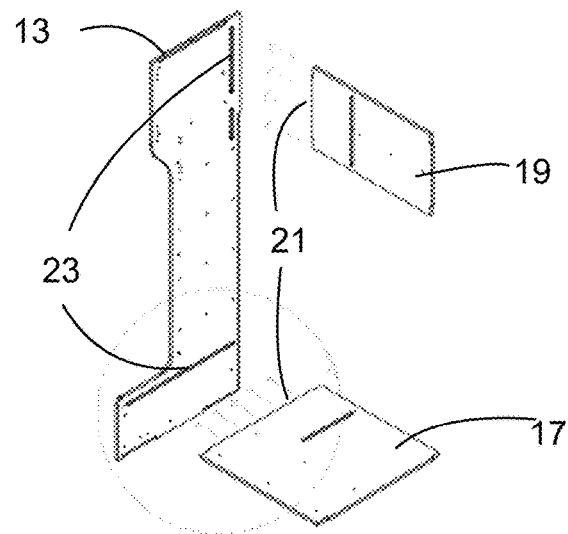
FIG. 2 is a partially exploded view of the locker of FIG. 1.

Referring now to FIGS. 1 and 2 in the drawings, an exemplary locker 11 according to the present application is illustrated. As can be seen, locker 11 comprises a pair of upstanding sidewalls 13 that generally define the extent of the locker. Each locker may be installed adjacent to another, similar or identical locker, with its rear against a wall, and its front facing the interior of the locker room. Alternatively, each locker may be "stand-alone" and spaced apart from other, similar or different lockers.

Between the sidewalls 13 of locker 11 a plurality of compartments 15 are defined by shelves 17 or other horizontally extending surfaces or platforms. Multiple additional sidewalls may be placed between the "main" or exterior sidewalls 13 to define compartments and the like. As used herein, "sidewall" or "sidewalls" may refer to either "main" sidewalls 13 or other sidewalls arranged between the "main" sidewalls. Each compartment 15 may be sized and otherwise configured for storage of clothing or sporting equipment or other items 15 and may include a door, which may be lockable. The number and configuration of compartments 15 may be varied to suit particular applications.

Shelves 17 that partially define compartments 15 are both functional and structural elements or members of locker 11. In their functional aspect, they divide the spaces between sidewalls 13 and define compartments. In this aspect, they may be employed to support heavy objects such as helmets or other athletic equipment. In their structural aspect, they secure 13 sidewalls together and are a key structural element of locker 11. Shelves 17 may also comprise drawers or sliding shelves that move forward and backward within locker 11.

In addition to shelves 17, one or more back wall members 19 may extend between sidewalls 13. These are primarily structural, but also serve to provide a back wall to locker 11 and its various compartments 15. Sidewalls 13, shelves 17, and back wall members 19 typically are formed of wood or similar material, such as plywood, strand board, fiberboard or the like, and may include various surface treatments, coatings, and/or layers, to provide other structural and/or aesthetic functions. One such surface treatment is diamond plate steel. The materials of sidewalls 13, shelves 17, and back wall 19, along with any surface treatments, provide protection from moisture, bacteria, and odors.

Figure 3:
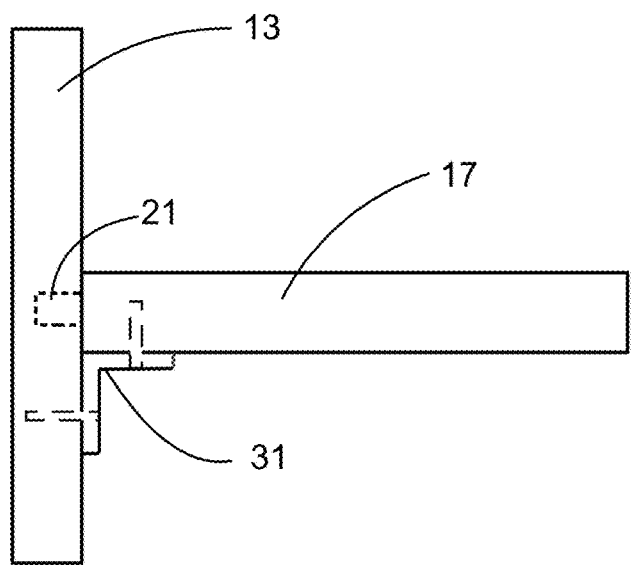
FIG. 3 is an enlarged view of a portion of an exemplary locker construction according to the present application.

Accordingly, each shelf 17 and back wall 19 is provided with a tongue 21 that is received in a correspondingly dimensioned groove or recess 23 in sidewall 13, as illustrated in FIGS. 2 and 3. Each tongue 21 may be secured in its respective groove by an adhesive or mechanical fasteners, or both. In addition, a metallic reinforcing member 31 may secured to each intersecting member (whether sidewall 13 and shelf 17 or back wall 19, etc.). In a preferred and exemplary embodiment, reinforcing member 31 is an "L-channel" or angle-iron formed of stainless steel. The horizontal and vertical extents of reinforcing member 31 may be secured to the surfaces of intersecting members 13, 17, 19 by adhesives or mechanical fasteners such as screws, or both.

Reinforcing member 31 may be a single member that extends the entire length of the intersection between members 13, 17, 19 or surfaces or may extend less than the entire length and may be made up of multiple discrete lengths of reinforcement. For maximum strength, the length of reinforcing member 31 should correspond as closely to that of the intersection between surfaces as is possible. Thus constructed and reinforced, locker 11 is extremely strong and rigid and its shelves are capable of bearing considerable weight.

Figure 4:
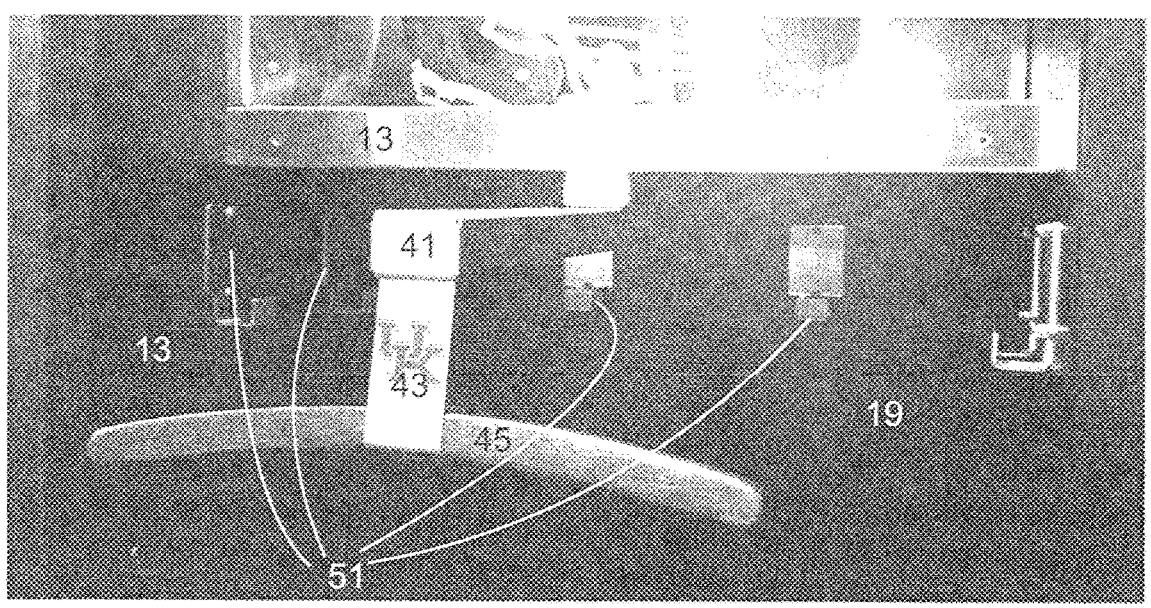
FIG. 4 illustrates an exemplary feature of a locker according to the present application.

FIG. 4 depicts the interior of a compartment of locker that includes a hanger assembly for heavy equipment, particularly shoulder pads for football or lacrosse. The hanger assembly comprises a sliding beam 41 that is slidably mounted by a heavy duty linear bearing or drawer slide to the underside of shelf 13. Beam 41 moves forward and back in, or in and out of, the compartment. A J-shaped hook 43 is secured at the forward end of beam 41. A hanger arm 45 is removably received in the lower part of hook 43 and is recessed or grooved in its central portion to register with the lower portion of hook to prevent longitudinal sliding of arm 45 in the hook 43. In operation, arm 45 is removed or disengaged from hook 43 and inserted into the neck portion of shoulder pads or other similar equipment or a garment such as a jersey. Arm 45, from which the equipment is suspended, then is reattached to hook 43. The entire assembly may be pushed rearward on beam 41 into the compartment of locker 11 to store the equipment. The procedure may be reversed to remove the equipment from locker 11. Also, a plurality of J-shaped hooks with square or rectangular bodies are secured to the sidewalls 13 and back wall 19 of the compartment for hanging various equipment and garments.

Figure 5:
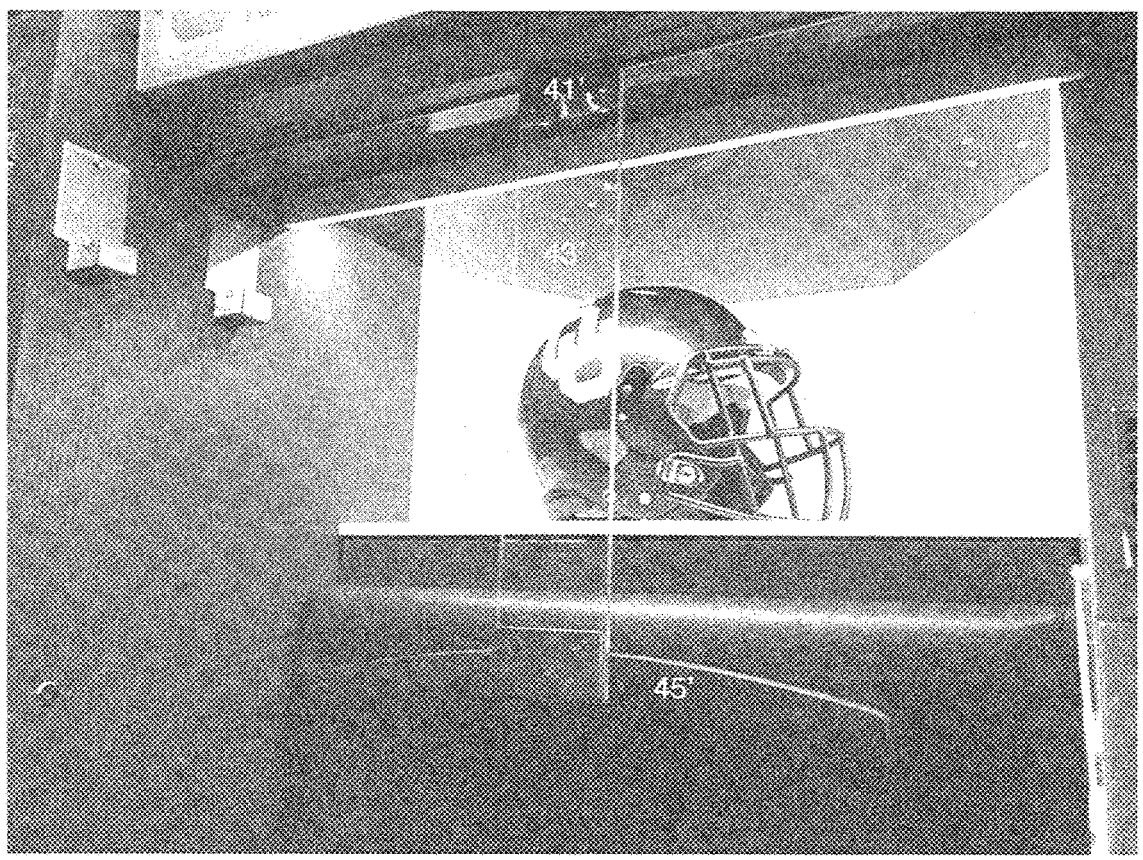
FIG. 5 depicts another embodiment of the feature of a locker shown in FIG. 4.
Figure 6A:
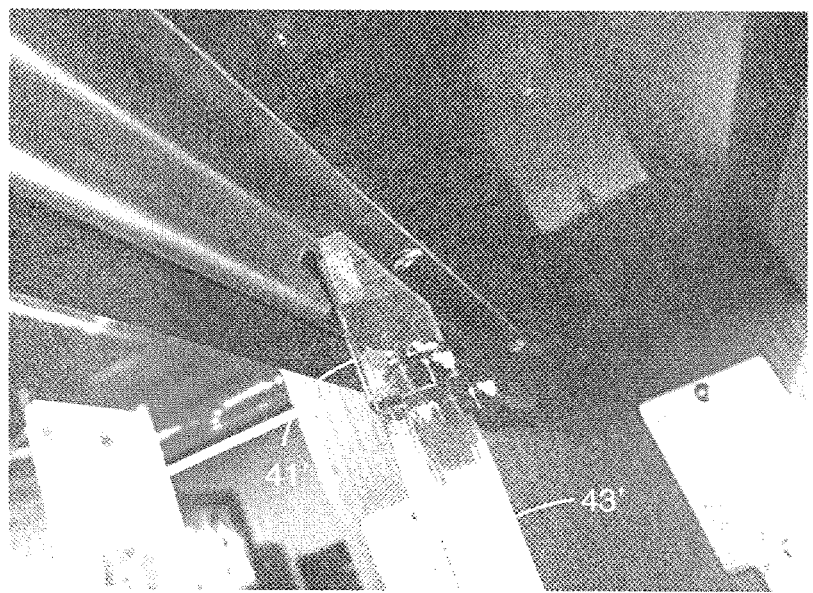
FIGS. 6A and 6B are enlarged views of a portion of the feature of FIG. 5.
Figure 6B:
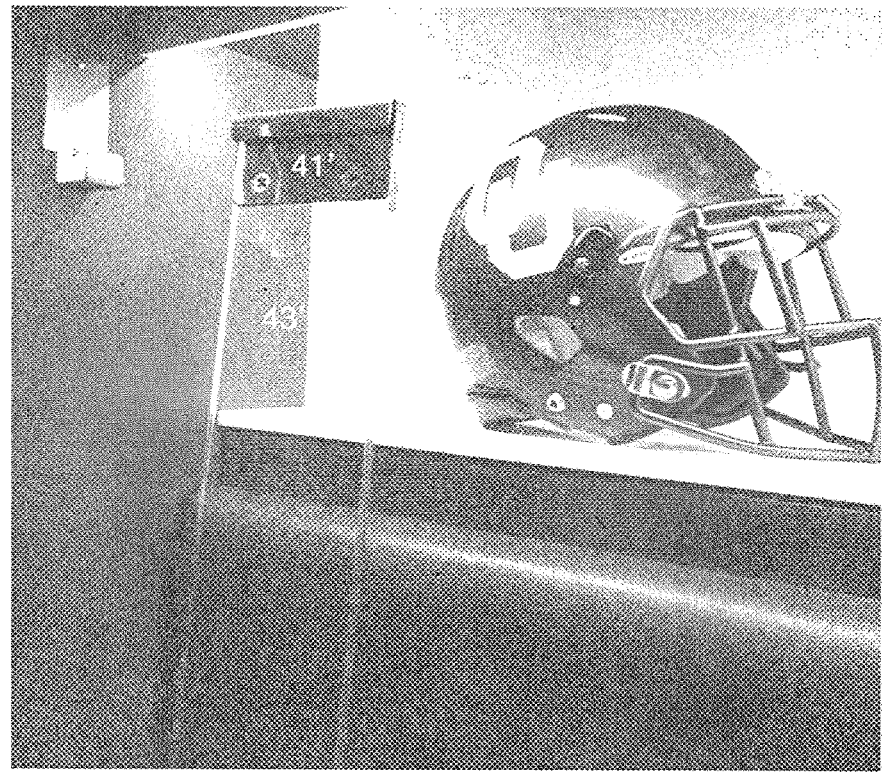

FIG. 5 depicts another embodiment of the hanger assembly of FIG. 4. In this embodiment, the middle section of hook 43 is formed of transparent polymer or plastic, preferably polycarbonate, and terminates at its upper end in a metallic (stainless steel) J-shaped hook member 41' (see FIGS. 6A and 6B) that is received in a correspondingly shaped channel formed in the forward portion of a shelf 17, drawer, or other horizontally extending member. The lower end of hook 43' is also stainless steel and J-shaped, and removably receives and supports arm 45', as described in connection with FIG. 4.

Figure 7:
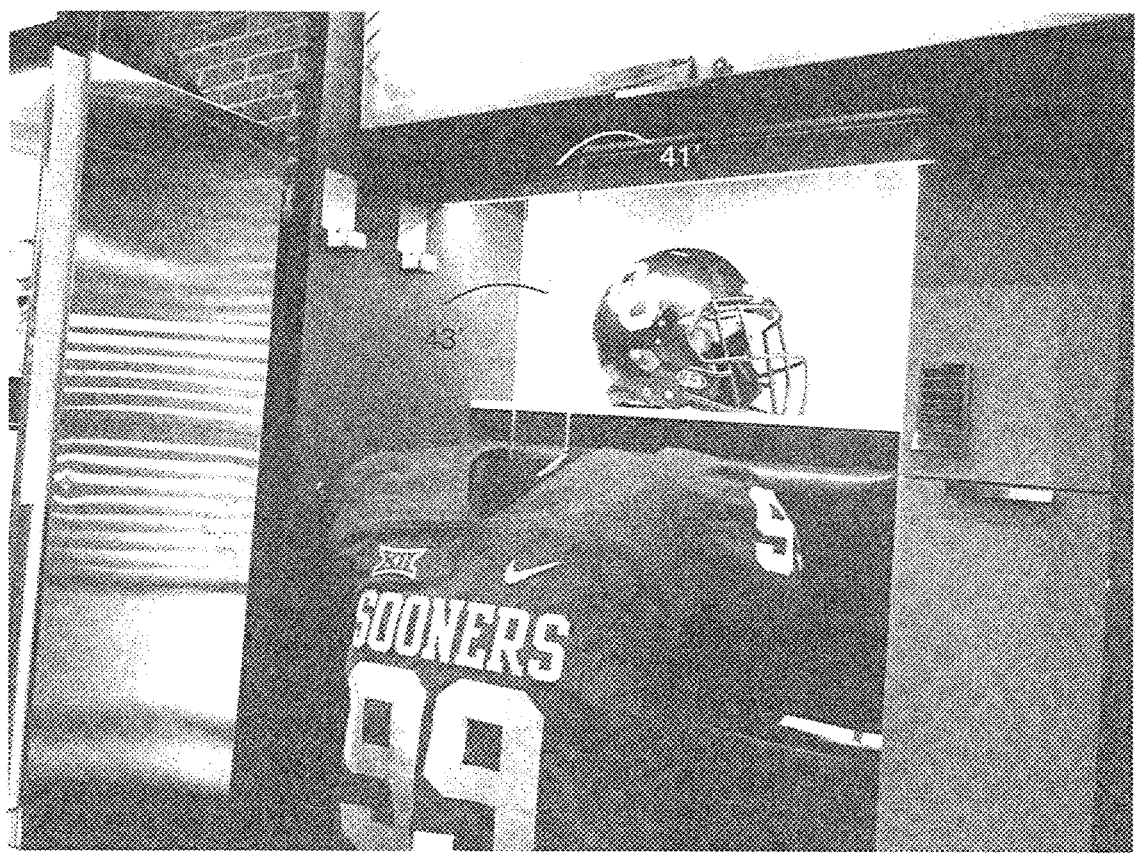
FIG. 7 illustrates the feature of FIGS. 4 and 5 in use.

FIG. 7 depicts the hanger assembly of FIG. 5 in use, supporting a set of shoulder pads and a jersey. Arm 45 may be removed from hook 43, inserted into the neck of the pads, and the pads and arm 45 hung or received in the lower J-shaped portion of hook 43'. The hook 41' at the upper end of hook 43 remains engaged or may be engaged with a correspondingly shaped recess to suspend the pads within locker 11. The hanger embodiment of FIG. 4 is used similarly, except the upper end of hook 43 is moved forward and aft within locker 11.

Figure 8:
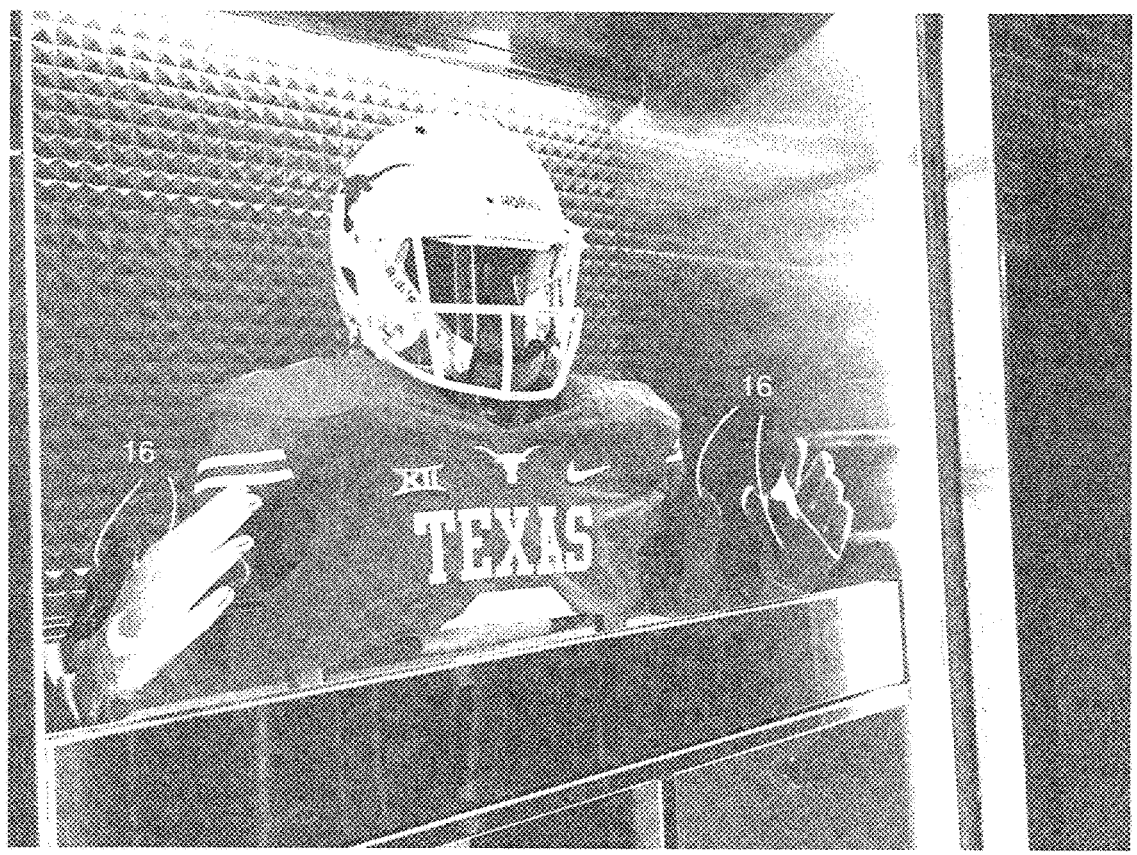
FIG. 8 depicts an exemplary feature of a locker according to the present application.
Figure 9:
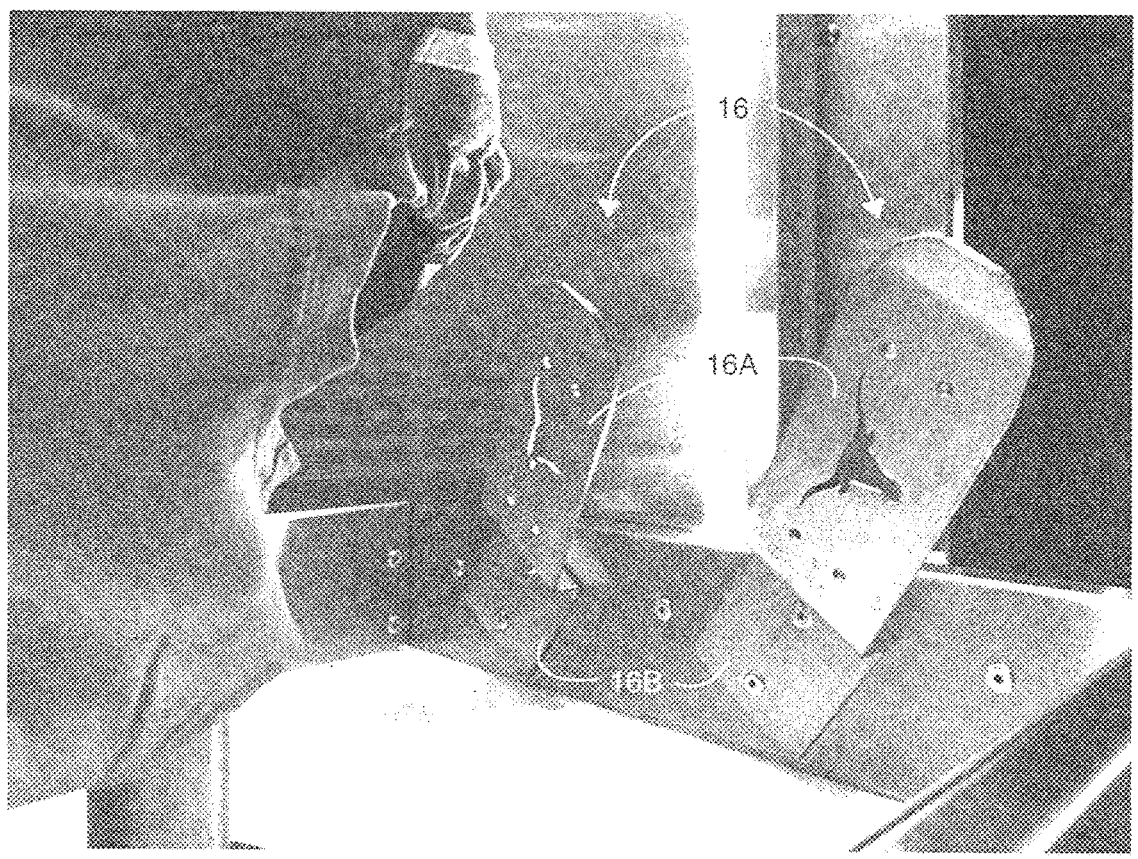
FIG. 9 is an enlarged view of a portion of the feature of a locker of FIG. 8.

FIGS. 8 and 9 illustrates a glove fixture 16 that may be mounted, usually in pairs, on one or both sidewalls 13 (or the back wall) of a compartment 15 of locker 11, or, as shown, on the upstanding sidewalls of a drawer, for storage and drying of athletic or sporting gloves. As shown in FIG. 9, Fixture 16 comprises a square or rectilinear base 16B that may be secured to sidewall 13 or back wall of compartment 15 by bolts, screws, rivets or other fasteners. A glove portion 16A may extend from the base at an angle away from the surface to which the base is secured. As is illustrated, glove portion 16A may also be laterally displaced from the surface. In use, the palm portion of a glove is placed over glove portion 16A so that the glove is "suspended," without touching any surface except the glove portion 16A received in the palm of the glove. The glove thus is positioned for efficient drying. Preferably, a pair of glove fixtures 16 are provided, one on each of the left and right sidewalls 13 of a locker compartment 15, or both on the back wall 17 of a compartment 15. Multiple pairs of fixtures 16 may be provided in a single or multiple compartments.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description and claims. Although the present embodiments are shown above, they are not limited to just these embodiments, but are amenable to various changes and modifications without departing from the spirit thereof.

I claim:

1. An improved locker, comprising:
   a pair of spaced-apart upstanding sidewalls;
   at least one member extending between the sidewalls, the member having a pair of ends;
   a flat planar tongue integrally formed on each end of the member;
   a groove formed in each sidewall, each groove dimensioned to receive the flat planar tongue integrally formed in the end of the member; and
   a metallic reinforcing member secured to each of the member and the sidewall in a corner formed by the member and the sidewall, the metallic reinforcing member extending longitudinally along the corner.

2. The locker of claim 1, wherein the member is a generally horizontal shelf.

3. The locker of claim 1, wherein the member is a vertically extending back wall.

4. The locker of claim 1, wherein the reinforcing member has an L-shaped cross-section with a pair of intersecting legs, one of the legs being secured to the member and the other of the legs being secured to the sidewall, in the corner formed by the member and the sidewall.

5. An improved locker, comprising:
   a pair of upstanding sidewalls;
   at least one shelf extending between the sidewalls and defining a compartment below the shelf;
   a beam slidably mounted to an underside of the shelf, wherein the beam moves forward and back within the compartment;
   a J-shaped hook carried on the end of the beam; and
   a hanger arm removably secured to the J-shaped hook;
   wherein the J-shaped hook is formed of a bent flat planar member generally perpendicular to the sidewalls; and
   wherein the J-shaped hook and the hangar arm move forward and back within the compartment.

6. The locker of claim 5, further comprising:
   a back wall.

7. The locker of claim 6, further comprising:
   a glove fixture comprising:
   a rectilinear base secured to the back wall, at least one of the sidewalls, or at least one of the shelves; and
   a glove portion extending out from the base.

8. The locker of claim 5, further comprising:
   a glove fixture comprising:

a rectilinear base secured to at least one of the sidewalls or at least one of the shelves; and
a glove portion extending out from the base.

* * * * *